United States Patent [19]

Dean

[11] Patent Number: 4,647,619

[45] Date of Patent: Mar. 3, 1987

[54] IMPACT MODIFIED POLYBUTYLENE TEREPHTHALATE RESIN MOLDING COMPOSITIONS

[75] Inventor: Barry D. Dean, Broomall, Pa.

[73] Assignee: Atlantic Richfield Company, Los Angeles, Calif.

[21] Appl. No.: 798,049

[22] Filed: Nov. 14, 1985

Related U.S. Application Data

[63] Continuation of Ser. No. 635,973, Jul. 30, 1984, abandoned.

[51] Int. Cl.$^4$ ............................................. C08L 51/00
[52] U.S. Cl. ........................................ 525/64; 525/69
[58] Field of Search ................... 525/64, 69, 78, 165

[56] References Cited

U.S. PATENT DOCUMENTS 4,172,859 10/1979 Epstein .............................. 525/109
4,260,690 4/1981 Binsack et al. ....................... 525/64

*Primary Examiner*—Theodore E. Pertilla
*Attorney, Agent, or Firm*—Dennis M. Kozak

[57] ABSTRACT

The impact resistance of molded polybutylene terephthalate resin molding compositions is improved by incorporating thereinto an elastomer grafted with a copolymer of an α-substituted acrylate with acrylic acid, methacrylic acid or a mixture thereof.

11 Claims, No Drawings

IMPACT MODIFIED POLYBUTYLENE TEREPHTHALATE RESIN MOLDING COMPOSITIONS

This is a continuation of application Ser. No. 635,973, filed July 30, 1984, now abandoned.

Reference is hereby made to copending applications Ser. Nos. 557,975 filed Dec. 5, 1983, now U.S. Pat. No. 4,491,647; 589,368 filed Mar. 4, 1984, now U.S. Pat. No. 4,593,074; 593,143 filed Mar. 26, 1984 and 596,220 filed Apr. 2, 1984, now both abandoned.

This invention relates to polybutylene terephthalate resins.

More specifically, this invention relates to impact modified polybutylene terephthalate resin containing molding compositions.

In one of its more specific aspects, this invention pertains to a polybutylene terephthalate resin based molding composition having excellent impact properties obtained by incorporating thereinto an ethylene/propylene/diene rubber which is highly grafted with a copolymer of an α-substituted acrylate with acrylic or methacrylic acid or a mixture thereof.

Techniques for improving the impact resistance of polybutylene terephthalate resins are known. For example, improved impact strength is obtained by melt compounding polybutylene terephthalate with ethylene homo- and copolymers functionalized with either acid or ester moieties as taught in U.S. Pat. Nos. 3,405,198; 3,769,260; 4,327,764; and 4,364,280. Moreover, U.S. Pat. No. 4,320,212 teaches modification of polyesters by blending with a polycarbonate and with elastomeric, acrylate copolymers. Polyblends of polybutylene terephthalate with a styrene/α-olefin/styrene triblock are taught in U.S. Pat. No. 4,119,607. And, U.S. Pat. No. 4,172,859 teaches impact modification of polybutylene terephthalate with random ethylene/acrylate copolymers and EPDM rubbers grafted with a monomeric ester or acid functionality.

The present invention provides yet another method for enhancing the impact resistance of polybutylene terephthalate resins upon molding.

According to this invention, there is provided a moldable composition comprising a polybutylene terephthalate resin and an elastomer grafted with from about 40 to about 60 weight percent of a copolymer of an α-substituted acrylate with acrylic acid, methacrylic acid or a mixture thereof wherein the copolymer is thermodynamically miscible with the polybutylene terephthalate resin.

Also according to this invention, there is provided a method of producing a molded composition which comprises forming a blend comprising a polybutylene terephthalate resin and an elastomer grafted with from about 40 to about 60 weight percent of a copolymer of an α-substituted acrylate with acrylic acid, methacrylic acid or a mixture thereof wherein the copolymer is thermodynamically miscible with the polybutylene terephthalate resin, and molding the resulting blend.

Also according to this invention, there is provided a molded composition comprising a continuous phase comprising a polybutylene terephthalate resin and a disperse phase within the continuous phase, the disperse phase being an elastomer grafted with from about 40 to about 60 weight percent of a copolymer of an α-substituted acrylate with acrylic acid, methacrylic acid or a mixture thereof wherein the copolymer is thermodynamically miscible with the polybutylene terephthalate resin and is part of the continuous phase, said elastomer grafted copolymer being present in the polybutylene terephthalate resin in an amount sufficient to improve the impact resistance of the polybutylene terephthalate resin upon molding.

According to this invention, there is also provided a method of improving the impact resistance of a polybutylene terephthalate resin upon molding which comprises incorporating into a continuous phase polybutylene terephthalate resin, a disperse phase comprising an elastomer grafted with from about 40 to about 60 weight percent of a copolymer of an α-substituted acrylate with acrylic acid, methacrylic acid, or a mixture thereof wherein the copolymer is thermodynamically miscible with the polybutylene terephthalate resin and is part of the continuous phase, said elastomer grafted with copolymer being incorporated in an amount sufficient to improve the impact resistance of the polybutylene terephthalat resin upon molding.

Two or more polymers are said to be thermodynamically miscible when the free energy of mixing is negative and, thermodynamic miscibility is said to exist when a mixture of two or more polymers results in a material exhibiting a single, well defined glass transition temperature.

The polybutylene terephthalate resin used in the examples which follow was Valox®325 polybutylene terephthalate resin commercially available from General Electric Company. However, any polybutylene terephthalate homopolymer or copolymer is suitable for use in the invention and accordingly, when used herein the term "polybutylene terephthalate resin" means a polybutylene terephthalate homopolymer or a polybutylene terephthalate copolymer that has a diacid component selected from isophthalic or terephthalic acid and a diol component that is a mixture of at least two of the following diols: 1,4-butanediol, ethylene glycol, 1,3 propane diol and 2,2-bis-(4-hydroxyphenyl)propane.

The impact modifier used in this invention is an elastomer highly grafted with a copolymer of an α-substituted acrylate with acrylic acid, methacrylic acid or a mixture thereof. The copolymer exhibits thermodynamic miscibility with the polybutylene terephthalate resin.

The elastomer component of the impact modifier will have random dialkyl or alkyl aryl peroxide functionality. Any elastomer having pendant allylic, benzylic or conjugated unsaturation at levels within the range from about 1 to about 20 wt. % is suitable for use.

Particularly suitable elalstomers are the olefin/α-olefin/nonconjugated diene terpolymers generally known as EPDM rubbers and butyl rubber. EPDM rubbers are preferred.

More specifically, the EPDM rubbers suitable for use in making the EPDM elastomer having random dialkyl or alkyl aryl functionality are based on mono olefins having the structural formula $CH_2=CHR$ in which R may be a hydrogen atom or a saturated alkyl group such as methyl, ethyl, n-propyl, isopropyl and the like. In addition, the EPDM rubbers are based on non-conjugated straight chain or cyclic diene hydrocarbons which are copolymerizable with the above mono olefins. Examples of suitable non-conjugated straight chain diene hydrocarbons copolymerizable with mono olefins are 1,4-pentadiene, 1,4-hexadiene, 1-5-hexadiene and the like. Examples of suitable cyclic diene hydrocarbons are bicyclo[2,2,1]hepta-2,5-diene, dicyclopentadiene and tetra cyclopentadiene. EPDM rubbers most preferred are terpolymer structures in which the mono olefins are ethylene and propylene, and the non-conjugated hydrocarbon diene is either 1,4-hexadene or dicyclopentadiene. The EPDM rubber should comprise 1 to 15% by weight of the non-conjugated diene hydrocarbon and 85 to 99% by weight of the mono olefins. The preferred ratio of the mono olefins, i.e., ethylene and propylene, should be 20/80 to 80/20, preferably between 35/65 to 65/35. Ethylene-propylene-ethylidene norbornene is not suitable for use in the practice of this invention. Methods for making these EPDM rubbers are well known and thoroughly described in U.S. Pat. No. 3,000,866 and U.S. Pat. No. 3,000,867, the teachings of which are incorporated herein by reference thereto.

Peroxide functionality is imparted to the elastomer as follows. The elastomer is dissolved in a solvent, preferably at a temperature within the range of from about at 60°-80° C. The resulting rubber solution is then treated with an oxidizing agent in the presence of a catalyst. The oxidizing agent is an alkyl or aryl hydroperoxide, most preferably it is t-butyl hydroperoxide. The catalyst is selected from any metal in Group VIIA, VIII, Ib or IIb with the appropriate choice of counter ion so as to promote solubility of the catalyst in the rubber solution. The peroxidation reaction is run for about 5 to about 20 hours at a temperature preferably within the range of from about 60° to about 80° C.

Suitable solvents for dissolving the elastomer include various aromatic solvents such as benzene, t-butylbenzene, toluene, xylenes, and halogenated benzenes such as chlorobenzene; however, most preferred are chlorobenzene and t-butylbenzene.

The catalyst employed to produce the peroxidized elastomer is based on metals of Group VIIa, VIII, Ib or IIb. The preferred metals are cobalt (Group VIII) or copper (Group IIb). Preferred catalysts are Cobalt (II) acetate, cobalt (II) propionate, cobalt (II) acetyl acetonate, cobalt (II) 2-ethyl hexanoate, cobalt (II) naphthenate, copper (I) acetate, copper (I) chloride, copper (I) acetyl-acetonate, copper (I) naphthenate, or copper (I) ethylacetoacetate. Most preferred are cobalt (II) ethylacetoacetate. Most preferred are cobalt (II) acetylacetonate, cobalt (II) naphthenate, copper (I) acetate, copper (I) chloride and copper (I) acetyl acetonate.

A peroxidized elastomer produced as described above typically exhibits 0.05 to 0.1 weight percent peroxide functionality which results in 40 to 60% grafting of the copolymer matrix.

The copolymer matrix which is grafted to the elastomer component will comprise 70 to 95% of an α-substituted acrylate monomer and 5 to 30% of either acrylic acid, methacrylic acid or their mixtures. Preferred compositions are 70 to 90% of an α-substituted acrylate monomer and 10 to 30% of methacrylic acid. The copolymer matrix molecular weight should be 50,000 to 500,000 preferably 50,000 to 250,000.

The α-substituted acrylate monomers can be selected from ethyl methacrylate, n-propyl methacrylate or isopropylmethacrylate. Most preferred is ethyl methacrylate.

The resulting elastomer-g-copolymer matrix is comprised in weight percent of from about 50 to 90 elastomer and from about 10 to about 50 of the copolymer matrix. The most preferred composition is from about 50 to about 70 elastomer and from about 50 to about 30 copolymer matrix.

A molding composition according to this invention will comprise in weight percent from about 99 to about 50 polybutylene terephthalate resin and from about 1 to about 50 of the elastomer-g-copolymer matrix. Preferably, the molding composition will comprise about 95 to about 60% polybutylene terephthlate resin and from about 5 to about 40% elastomer-g-copolymer matrix.

The elastomer-g-copolymer matrix is preferably stabilized prior to blending with polybutylene terephthalate resin with 2 weight percent of any conventional stabilizer. A preferred stabilizer is a 50:50 mixture of Ethanox®330 (Ethyl Corp) [1,3,5-trimethyl-2,4,6-tris(3,5-di-tertbutyl-4-hydroxy benzyl)benzene] and Mark®2112 (Witco Chemical Corporation) tris(2,4-ditertbutyl-phenyl)phosphite.

The molding compositions of this invention can be molded using conventional molding equipment and the molding compositions can also include other ingredients such as extenders, processing aids, pigments, mold release agents, and the like, for their conventionally employed purpose. Also reinforcing fillers in amounts sufficient to impart reinforcement can be used, such as titanium dioxide, potassium titanate and titanate whiskers, glass flakes and chopped glass fibers.

The following examples serve to demonstrate the invention. Evaluation of material properties was performed based on the following ASTM standard test: Flexural modulus (D-790), tensile strength (D-638), elongation (D-648), notched Izod (D-256) and DTUL (deflection temperature underload, $\frac{1}{8}''$ at 264 psi, (D-648). Gardner falling weight index was established using a $1\frac{1}{4}''$ diameter orifice and an 8 pound $\frac{1}{2}''$ diameter weight. Glass transition temperature, melting temperature, and heat of fusion was determined by differential scanning calorimetry.

EXAMPLE 1

This example demonstrates the preparation of a peroxidized elastomer suitable for use in this invention. The teachings of Ser. No. 589,368 are incorporated herein by reference thereto.

In a 4-liter resin kettle 200 grams of an ethylene/propylene/dicyclopentadiene (EPDM) terpolymer were dissolved in 2700 grams of chlorobenzene. The EPDM rubber dissolved readily in three and one-half hours by heating the solution to 70° C.

The resin kettle was charged with 120 grams of a 40% anhydrous t-butyl hydroperoxide in toluene solution.[1]

[1] Prepared by extraction of a 70% t-butyl-hydroperoxide water solution with toluene according to the procedure described by K. B. Sharpless et al *Journal of Organic Chemistry*, 1983, 48 3607.

Immediately after the addition of the hydroperoxide solution, 20 grams of a 6% cobalt solution as cobaltous napthenate in mineral spirits and 1.7 grams of cobaltous acetylacetonate dissolved in 22 milliliters of tetrahydrofuran were added. The reaction mixture was maintained at 70°-72° C. for 8 hours. The EPDM rubber was dried in vacuo at 25° C. and then dissolved in toluene and precipitated into methanol a second time. The peroxidized rubber was dried in vacuo at 25° C. for 48 hours. The level of peroxide functionality in the EPDM rubber was 1067 ppm.

EXAMPLE 2

Approximately 200 grams of peroxidized EPDM rubber having 1067 ppm peroxide functionality was prepared according to the procedure of Example 1. Next, the 200 grams of peroxidized EPDM were dissolved in 500 grams of chlorobenzene in a 3 pint pressure reaction vessel at 60° C.

The reaction vessel was charged with 200 grams of a comonomer mixture comprised of 164 grams of ethyl methacrylate and 36 grams of methacrylic acid. The vessel was heated to 140° C. for four and one-half hours. The polymer mass obtained was precipitated in a four fold excess of methanol using a Waring Blender.

The polymer crumb obtained was dried under vacuum at 110° C. The total EPDM-g-ethyl methacrylate/methacrylate acid (EMA/MAA) recovered was 388 grams (97%). The final composition was 52% EPDM; 48% EMA/MAA.

The composition of the EMA/MAA was 82% ethyl methacrylate and 18% methacrylic acid. Soxhlet extraction of 25 grams of EPDM-g-EMA/MAA with methyl ethyl ketone for 170 hours revealed 6.8 grams of non-grafted EMA/MAA (56%) having a peak molecular weight 197,500; Mw of 242,300; and Mn of 134,000. The level of EMA/MAA grafted to the EPDM rubber was 44%. The glass transition temperature of both the grafted and non-grafted EMA/MAA was 120° C.

EXAMPLE 3

This example serves to illustrate the utility of the EPDM-g-EMA/MAA as an impact modifier for polybutylene terephthalate resins.

Three molding compositions having the formulations set forth in Table I were prepared and stabilized with 1.5 wt. % each of Mark ®2112 antioxidant and Ethanox ®330 antioxidant. The compositions were extruded, pelletized and test specimens injection molded for property analysis. Property values obtained are shown in Table I.

TABLE I

| | Composition | | | |
|---|---|---|---|---|
| | Amount in wt % | | | |
| Ingredient | | | | |
| Valox ® 325 PBT | 100 | 80 | 70 | 60 |
| EPDM-g-EMA/MAA | 0 | 20 | 30 | 40 |
| Property Test | | | | |
| Tg (°C., DSC) | 62 | 66 | 72 | 77 |
| Tm (°C.) | 229 | 227 | 228 | 226 |
| Tensile str (psi) | 7,200 | 7,100 | 6,900 | 65,200 |
| Flex str (psi) | 3,700 | 12,100 | 12,200 | 10,300 |
| Flex mod (psi) | 340,000 | 341,000 | 343,000 | 295,000 |
| DTUL (⅛" °F.) 264 psi | 126 | 139 | 148 | 147 |
| Notched izod (ft-lbs/in) | 1.0 | 3.1 | 8.7 | 9.1 |
| GFWI (in-lbs) | 480+ | 480+ | 480+ | 480+ |
| Elongation (%) | 300 | 160 | 171 | 187 |

The above data illustrate that there exists thermodynamic miscibility between the EMA/MAA copolymer and the amorphous regions of the PBT resin. Moreover, the data show that the molded compounds of this invention possess excellent impact resistance as well as heat resistance.

It will be evident from the foregoing that various modifications can be made to this invention. Such, however, are considered as being within the scope of the invention.

What is claimed is:

1. A moldable composition comprising a polybutylene terephthalate resin selected from the group consisting of polybutylene terephthalate homopolymer and polybutylene terephthalate copolymer and an elastomer grafted with from about 40 to about 60 weight percent of a copolymer of from 70 to 95 percent of an α-substituted acrylate with from 5 to 30 percent of acrylic acid, methacrylic acid or a mixture thereof wherein said copolymer is thermodynamically miscible with the polybutylene terephthalate resin such that the composition exhibits a single glass transition temperature and wherein said polybutylene terephthlate copolymer has a diacid component selected from the group consisting of isophthalic acid and terephthalic acid and at least two diol components selected from the group consisting of 1,4-butane diol, ethylene glycol, 1,3-propane diol and 2,2-bis-(4-hydroxyphenyl)propane.

2. The composition of claim 1 in which said elastomer is ethylene/propylene/1-4 hexadiene.

3. The composition of claim 1 in which said elastomer is ethylene/propylene/dicyclopentadiene.

4. The composition of claim 1 in which said elastomer is butyl rubber.

5. The composition of claim 1 in which said α-substituted acrylate is selected from the group consisting of ethyl methacrylate, n-propyl methacrylate and isopropyl methacrylate.

6. The composition of claim 2 in which said elastomer is grafted with an ethyl methacrylate/methacrylic acid copolymer.

7. The composition of claim 3 in which said elastomer is grafted with an ethyl methacrylate/methacrylic acid copolymer.

8. The composition of claim 4 in which said elastomer is grafted with an ethyl methacrylate/methacrylic acid copolymer.

9. The composition of claim 1 containing a reinforcing filler.

10. The composition of claim 1 in which said elastomer grafted with copolymer is present in an amount within the range of from about 1 to about 50 weight percent and said polybutylene terephthalate resin is present in an amount within the range of from about 50 to about 99 weight percent.

11. A molded composition comprising a continuous phase comprising a polybutylene terephthalate resin and a disperse phase being an elastomer grafted with from about 40 to about 60 weight percent of a copolymer of an α-substituted acrylate with acrylic acid, methacrylic acid or a mixture thereof wherein the copolymer is thermodynamically miscible with the polybutylene terephthalate resin and is part of the continuous phase, said elastomer grafted with copolymer being present in an amount sufficient to improve the impact resistance of the polybutylene terephthalate resin upon molding.

* * * * *